No. 731,908. PATENTED JUNE 23, 1903.
C. JOHNSON.
COMBINED SUPPORTING AND ATTACHING DEVICE.
APPLICATION FILED SEPT. 10, 1902.
NO MODEL.
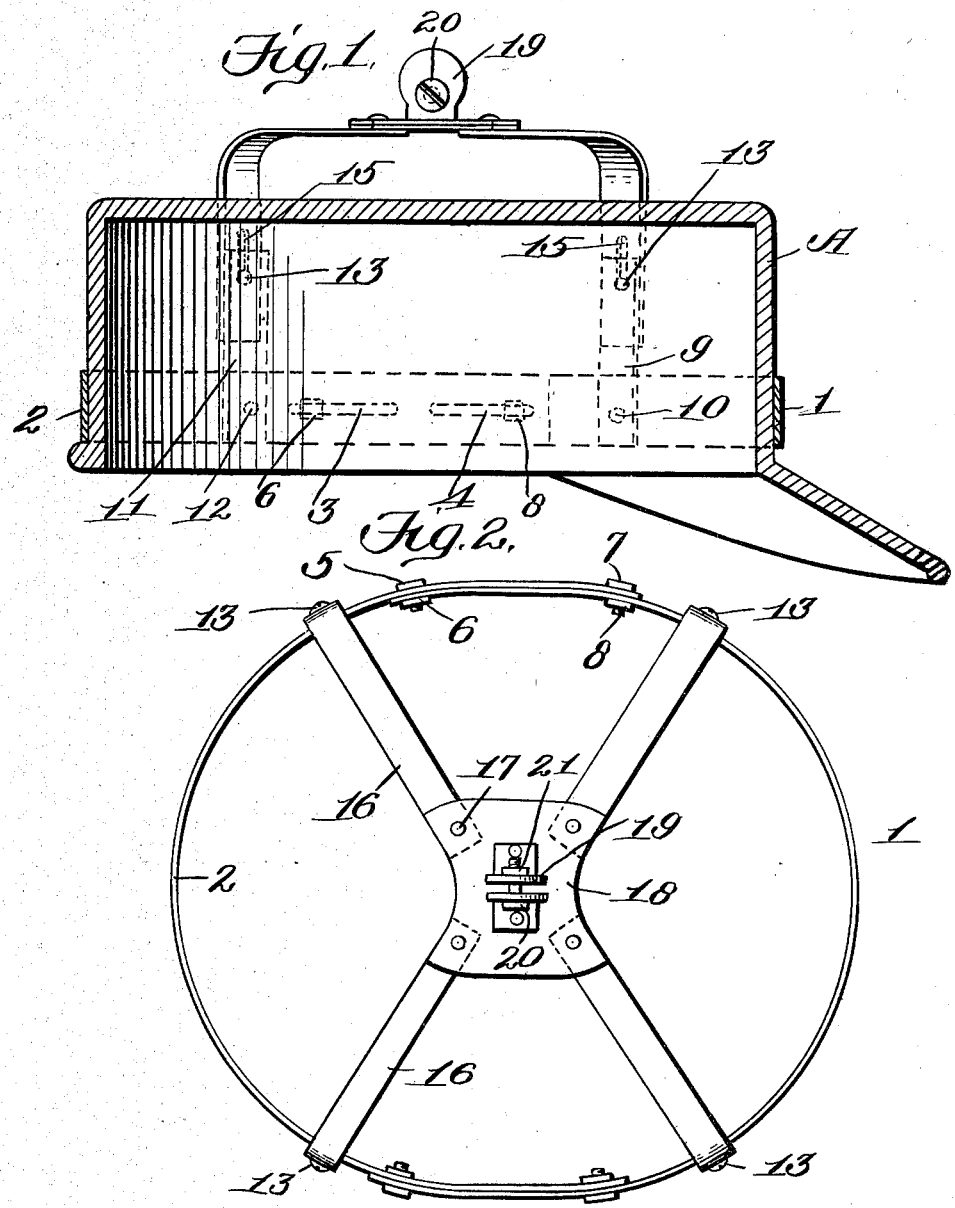

No. 731,908.

Patented June 23, 1903.

UNITED STATES PATENT OFFICE.

CHARLES JOHNSON, OF BUTTE, MONTANA.

COMBINED SUPPORTING AND ATTACHING DEVICE.

SPECIFICATION forming part of Letters Patent No. 731,908, dated June 23, 1903.

Application filed September 10, 1902. Serial No. 122,886. (No model.)

*To all whom it may concern:*

Be it known that I, CHARLES JOHNSON, a citizen of the United States, residing at Butte, in the county of Silverbow and State of Montana, have invented new and useful Improvements in a Combined Supporting and Attaching Device, of which the following is a specification.

This invention relates to certain new and useful improvements in a combined supporting and attaching device, and is particularly adapted for use in supporting and attaching a lamp or other object.

The invention aims to construct a supporting device particularly adapted for supporting a lamp used for bandsmen, miners, campaign marching-clubs, and for supporting other illuminating devices.

The invention further aims to provide a supporting device which is adjustable, so it can be attached to various-sized objects, caps, or hats, and further adjustable vertically, so that the device it is carrying can be elevated or lowered, as occasion requires.

The invention further aims to construct a supporting device for the purpose set forth which shall be extremely simple in its construction, strong, adjustable, durable, efficient in its use, and comparatively inexpensive to manufacture.

To this end the invention consists of the novel combination and arrangement of parts hereinafter more specifically described, illustrated in the accompanying drawings, and particularly pointed out in the claims hereunto appended.

In describing the invention in detail reference is had to the accompanying drawings, forming a part of this specification, wherein like reference characters indicate corresponding parts throughout the several views, and in which—

Figure 1 is a sectional elevation of my improved supporting device as applied to a cap. Fig. 2 is a top plan view of the supporting device, and Fig. 3 is a sectional detail view.

I have shown my improved supporting device as attached to a cap for the purpose of illustration, and referring to the drawings by reference characters, A denotes the cap, mounted upon which, as before stated, is the supporting device.

The supporting device, which may properly be termed a "supporting and attaching device for a lamp or other object," consists of a pair of semicylindrical flat strips of suitable material 1 2, standing on edge, which when connected together form an adjustable attaching-band for connecting the supporting device to a suitable object or head-covering, the latter, as shown, consisting of the cap A. The strips 1 2 may be of different shape, if desired—that is to say, when the strips are connected together the contour of the same will be such as to form the band square, pentagon, hexagonal, septangular, or octagonal. The end portions of each of the strips 1 2 overlap each other—that is to say, one end of the strip 1 overlaps one end of the strip 2 and one end of the strip 2 overlaps one end of the strip 1. Each of the end portions of the strips 1 2 is provided with a pair of longitudinally-extending elongated slots 3 4. The slots 3 of the strip 1 are adapted to register with the slots 4 of the strip 2 and the slots 4 of the strip 1 are adapted to register with the slots 3 of the strip 2. Extending through the slot 3 of the strip 1 and the slot 4 of the strip 2 is an adjusting-bolt 5, carrying the nut 6, and extending through the slot 3 of the strip 2 and the slot 4 of the strip 1 is an adjusting-bolt 7, carrying the nut 8. By this arrangement the attaching-band formed by the strips 1 2 can be adjusted to various sizes, as well as being securely attached to the head-covering or other object, which, as shown, is the cap A. This adjustment can be had by simply loosening the nuts 6 8 and moving the strips 1 2 toward or away from each other and then screwing home the nuts 6 8, which will securely connect the strips together as well as to the object upon which the support is mounted. The reference character 9 denotes a pair of vertical standards (one of which is shown in dotted lines in Fig. 1) which are secured at their lower ends by means of the rivet or other suitable device 10 to the outer face of the strip 1, preferably diametrically opposite each other, and the reference character 11 denotes a pair of vertical standards (one of which is shown in dotted lines in Fig. 1) which are secured at their lower ends by means of the rivet or other suitable fastening means 12 to the outer face of the strip 2, preferably diametrically opposite each other. The standards 9 and 11 are rigidly secured to the strips 1 2.

Each of the standards 9 and 11 carries a clamping-screw 13, the purpose of which is to permit of the adjustment and affixing of the attaching-arms 14. An attaching-arm 14 is provided for each of the standards 9 and 11 and are substantially of inverted-L shape in contour, with the lower end portion of the vertical part thereof provided with a vertically-extending slot 15, through which extends the clamping-screw 13. The attaching-arms at their upper ends extend inwardly toward each other, as at 16, and have their ends suitably connected, as at 17, to the connecting-plate 18. The ends of the inwardly-extending portion 16 of the attaching-arms are preferably connected to each corner of the connecting-plate 18.

The connecting-plate 18 is provided on its upper face with a pair of clamping-jaws 19, through which extends the clamping bolt or screw 20, carrying on one end the nut 21. Between the jaws 20 is adapted to be clamped the lamp or other object. The clamping screw or bolt 20 extends through the lower portion of the jaws 19, so that when the lamp or other object is secured between the jaws above the bolt or screw 12 it will not prevent the lamp or other object being set at any angle, and it will also permit of the lamp or other object being detached from the supporting device without removing the bolt or screw 20 from the jaws 19 or without removing the nut 21. Simply loosening the said nut will permit of the lamp or other object being detached from the supporting device.

It will be evident that by loosening the screw 13 the attaching-arms can be adjusted to the height desired, and then on driving the screw 13 home the attaching-arms will be securely connected to the standards 9 11.

The adjustable supporting and attaching device is preferably constructed of aluminium, although other material can be employed if desired; but when aluminium is employed the structure is extremely light.

It is thought the many advantages of my improved supporting and attaching device for lamps or other objects can be readily understood from the foregoing description, taken in connection with the accompanying drawings, and it will furthermore be evident that changes, variations, and modifications can be resorted to without departing from the spirit of the invention or sacrificing any of its advantages, and I therefore do not wish to restrict myself to the details of construction hereinbefore described and as shown in the accompanying drawings, but reserve the right to make such changes, variations, and modifications as come properly within the scope of the protection prayed.

Having thus fully described my invention, what I claim as new, and desire to secure by Letters Patent, is—

1. In a device of the character described, an adjustable band, a plurality of standards suitably connected to said band, a plurality of attaching-arms adjustably connected at one end to said standards, a plate suitably connected to the other end of the said attaching-arms, and a clamping device suitably carried by the said plate.

2. A device of the character described, comprising a pair of strips of suitable material, means for adjustably connecting the said strips together, a plurality of standards carried by the said strips, a plurality of attaching-arms having their upper portion extending toward each other, means for adjustably connecting one end of the said attaching-arms to the said standards, a plate suitably connected to the other end of the said attaching-arms, and a clamping device suitably carried by said plate.

3. A device of the character described, comprising a pair of strips of suitable material and having their ends provided with a pair of slots registering with each other, means extending through the said slots for adjustably connecting the strips together, a plurality of standards suitably connected to said strips, a plurality of attaching-arms having their upper portions extending inwardly toward each other and their lower portions provided with vertically-extending slots, means extending through said slots of the attaching-arms and engaging in the standards for adjustably connecting the said attaching-arms to the said standards, a plate suitably connected to the inwardly-extending portions of the said attaching-arms, a pair of jaws suitably carried by said plate, and a clamping means suitably extending through the said jaws.

4. A device of the character described, comprising an adjustable band, a plurality of standards suitably connected to said band, adjustable attaching-arms suitably connected to said standards and having their upper portions extending inwardly, and a clamping device suitably connected with the said inwardly-extending portions of the said attaching-arms.

In testimony whereof I have hereunto set my hand in presence of the subscribing witnesses.

CHARLES JOHNSON.

Witnesses:
W. Y. PEMBERTON,
H. LOWNDES MAURY,
M. L. JONES.